United States Patent Office.

LEWIS S. FILBERT, OF PHILADELPHIA, PENNSYLVANIA.

Letters Patent No. 108,696, dated October 25, 1870.

IMPROVEMENT IN PAVEMENTS.

The Schedule referred to in these Letters Patent and making part of the same.

To all whom it may concern:

Be it known that I, LEWIS S. FILBERT, of Philadelphia, in the county of Philadelphia and in the State of Pennsylvania, have invented certain new and useful Improvements in Compounds for Pavements, &c.; and do hereby declare that the following is a full, clear, and exact description thereof.

The nature of my invention consists in a new compound or composition for pavements or other purposes of like nature, and is intended as an improvement upon the patent of John L. Kidwell, No. 90,106, dated May 18, 1869.

In order to enable others skilled in the art to which my invention appertains to make and use the same, I will now proceed to describe it.

My composition is composed of the following ingredients, in about the following proportions:

Eighty pounds asphalt; thirty pounds rosin, pitch, coal-tar, or pine-tar; five pounds sulphuric acid; ninety pounds lime; six hundred pounds sand, fine gravel, ground iron cinder, and broken stone or slag; and in some cases I may use one hundred and ninety pounds coal-ashes.

The sand, gravel, cinder, stone, and slag, with the ashes, are first mixed and heated until dry, when the lime, asphalt, rosin, and acid or sulphur are added and boiled to a suitable consistency by any means.

The mixed compound is then spread upon the ground previously prepared to receive it, and rolled by heated or other rollers.

The sulphuric acid hardens the compound very effectually. In some cases sulphur may be used instead of sulphuric acid, and, when substituted, ten pounds of the sulphur should be used.

I do not confine myself to the exact proportions of the ingredients herein mentioned, as the same may be varied according to the climate in, or the purpose for, which the compound is to be used.

Having thus fully described my invention,

What I claim as new, and desire to secure by Letters Patent, is—

The improved composition for pavements and other purposes, as above described and set forth.

In testimony that I claim the foregoing, I have hereunto set my hand this 22d day of August, 1870.

L. S. FILBERT.

Witnesses:
 C. M. ALEXANDER,
 EDM. F. BROWN.